United States Patent
Saxena et al.

(10) Patent No.: US 12,531,788 B2
(45) Date of Patent: Jan. 20, 2026

(54) METHOD AND SYSTEM FOR AUTOMATICALLY GENERATING NETWORK DESIGN DOCUMENTS USING GENERATIVE ARTIFICIAL INTELLIGENCE (AI) MODELS

(71) Applicant: INFOSYS LIMITED, Bangalore (IN)

(72) Inventors: Gaurav Saxena, Bangalore (IN); Praveen Kumar Kalapatapu, Bangalore (IN); Elangovan Thanasekaran, Bangalore (IN); Varun Ahluwalia, Bangalore (IN); Sreekanth Sreedevi Sasidharan, Bangalore (IN)

(73) Assignee: Infosys Limited, Bangalore (IN)

( * ) Notice: Subject to any disclaimer, the term of this patent is extended or adjusted under 35 U.S.C. 154(b) by 6 days.

(21) Appl. No.: 18/618,260

(22) Filed: Mar. 27, 2024

(65) Prior Publication Data

US 2025/0310211 A1 Oct. 2, 2025

(51) Int. Cl.
*H04L 41/14* (2022.01)
*H04L 41/12* (2022.01)

(52) U.S. Cl.
CPC ............ *H04L 41/145* (2013.01); *H04L 41/12* (2013.01)

(58) Field of Classification Search
CPC ....... H04L 41/145; H04L 41/14; H04L 41/12; H04L 12/12; H04L 41/147; H04W 16/18; G06N 20/00; G06N 3/04; G06N 3/0464; G06N 3/09; G06N 3/08
See application file for complete search history.

(56) References Cited

U.S. PATENT DOCUMENTS

| | | | |
|---|---|---|---|
| 10,200,877 B1 * | 2/2019 | Skidmore | H04W 16/22 |
| 10,693,739 B1 * | 6/2020 | Naseri | G06F 16/29 |
| 2007/0260436 A1 * | 11/2007 | Couretas | G06F 30/30 |
| | | | 703/6 |
| 2021/0157551 A1 * | 5/2021 | Bliss | G06F 40/216 |
| 2022/0173978 A1 * | 6/2022 | Metaxas | H04L 41/145 |
| 2023/0133057 A1 * | 5/2023 | Murthy | G06N 3/08 |
| | | | 709/220 |
| 2023/0244827 A1 * | 8/2023 | Chandragiri | G06F 30/27 |
| | | | 703/1 |
| 2023/0336435 A1 * | 10/2023 | Dostie, Jr. | H04L 43/0811 |
| 2023/0354050 A1 * | 11/2023 | Anderson | H04W 16/18 |
| 2024/0281487 A1 * | 8/2024 | Bathwal | G06F 16/9558 |
| 2024/0406074 A1 * | 12/2024 | Basuti | H04L 67/51 |
| 2025/0071578 A1 * | 2/2025 | Zhao | H04L 12/12 |

* cited by examiner

*Primary Examiner* — Jason D Cardone
(74) *Attorney, Agent, or Firm* — Finnegan, Henderson, Farabow, Garrett & Dunner, LLP (57) ABSTRACT

This disclosure relates to a method and a system for generating a network design document for a communication network using a generative AI model. The method includes receiving, by the generative AI model, a user query corresponding to the communication network to generate the network design document for the communication network. The method further includes retrieving, by the generative AI model, current network information associated with the communication network using a predefined retrieving technique, upon receiving the user query. The method further includes processing, by the generative AI model, the user query and the current network information associated with the communication network. The method further includes generating in a pre-defined format, by the generative AI model, the network design document for the communication network in response to the processing.

11 Claims, 5 Drawing Sheets

METHOD AND SYSTEM FOR AUTOMATICALLY GENERATING NETWORK DESIGN DOCUMENTS USING GENERATIVE ARTIFICIAL INTELLIGENCE (AI) MODELS

TECHNICAL FIELD

This disclosure relates generally to Artificial Intelligence (AI), and more particularly to a method and a system for generating a network design document for a communication network using a generative AI model.

BACKGROUND

In recent years, there have been significant changes and advancements in a field of telecommunications. As a result of rapid technological advancements, increased connectivity, and changing consumer preferences, landscape of telecommunication companies is constantly evolving. Telecommunication companies play a pivotal role in establishing and maintaining the backbone of modern communication networks. To plan and design a telecommunication network, main focus of the telecommunication companies rely on creation of comprehensive network design documents as it is a fundamental requirement of any successful and resilient telecommunication network. In particular, a network design document is a comprehensive and structured document that outlines a planned architecture, configuration, and specifications for the telecommunication network. It serves as a blueprint for designing, implementing, and maintaining infrastructure of the telecommunication network. The telecommunication companies create the network design document to ensure that the telecommunication network meets specific requirements of their clients or business objectives.

Currently, for creating the network design documents, members of telecommunication team of these companies manually navigate a complex landscape of technologies, requirements, deployment, and challenges. While the need for meticulous network design documents is clear, the members of the telecommunication team face various challenges in creating the network design documents using existing techniques. This is because, the current techniques used by the telecommunication companies for creating the network design documents are completely manual that include client consultation, conducting surveys for requirements analysis and understanding client enterprise architecture, high-level design creation, low-level design creation, security considerations, scalability planning, creating operational guidelines, maintaining compliance with industry standards, and like. Moreover, the current techniques of creating the network design documents are time consuming and require significant human effort.

Since the current techniques of creating the network design documents heavily rely on humans, hence the current techniques may face challenges such as incomplete requirement gathering, lack of complexity management, difficulty in tracking and maintaining different versions of the network design documents, communication gaps, and unadaptability to changes. Therefore, there is a need to address the above listed challenges faced by the telecommunication companies in creating and maintaining the network design documents.

There is, therefore, a need in the present state of art, for techniques to address the problems in generating network design documents for communication networks.

SUMMARY

In one embodiment, a method for generating a network design document for a communication network using a generative Artificial Intelligence (AI) model is disclosed. In one example, the method may include receiving, by the generative AI model, a user query corresponding to the communication network to generate the network design document for the communication network. The method may include retrieving, by the generative AI model, current network information associated with the communication network using a predefined retrieving technique, upon receiving the user query. The method may include processing, by the generative AI model, the user query and the current network information associated with the communication network. The method may include generating in a pre-defined format, by the generative AI model, the network design document for the communication network in response to the processing.

In another embodiment, a system for generating a network design document for a communication network using a generative Artificial Intelligence (AI) model is disclosed. In one example, the system may include a processing circuitry and a memory communicatively coupled to the processing circuitry. The memory may store processor-executable instructions, which, on execution, may cause the processing circuitry to receive a user query corresponding to the communication network to generate the network design document for the communication network. The processor-executable instructions, on execution, may further cause the processing circuitry to retrieve current network information associated with the communication network using a pre-defined retrieving technique, upon receiving the user query. The processor-executable instructions, on execution, may further cause the processing circuitry to process the user query and the current network information associated with the communication network. The processor-executable instructions, on execution, may further cause the processing circuitry to generate in a pre-defined format, the network design document for the communication network in response to the processing.

In yet another embodiment, a non-transitory computer-readable medium storing computer-executable instructions for generating a network design document for a communication network using a generative Artificial Intelligence (AI) model is disclosed. In one example, the stored instructions, when executed by a processor, cause the processor to perform operations including receiving a user query corresponding to the communication network to generate the network design document for the communication network. The operations may further include retrieving current network information associated with the communication network using a predefined retrieving technique, upon receiving the user query. The operations may further include processing the user query and the current network information associated with the communication network. The operations may further include generating in a pre-defined format the network design document for the communication network in response to the processing.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
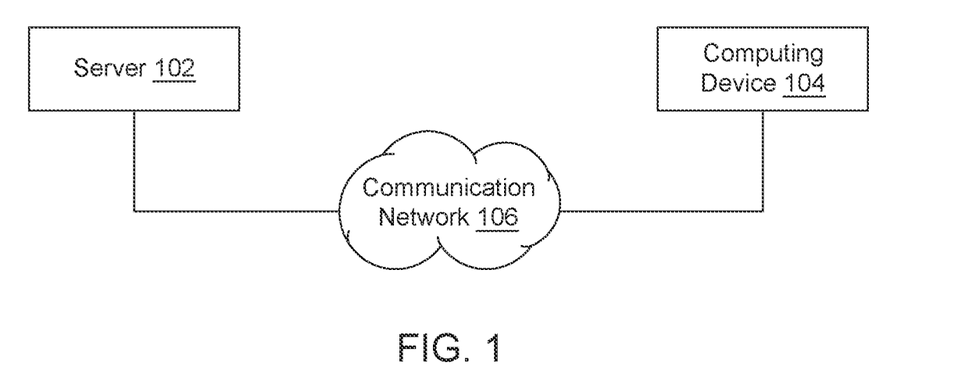
FIG. 1 illustrates a block diagram of an environment for generating a network design document for a communication network using a generative Artificial Intelligence (AI) model, in accordance with an exemplary embodiment of the present disclosure.

Referring now to FIG. 1, a block diagram of an environment 100 for generating a network design document for a communication network using a generative Artificial Intelligence (AI) model is illustrated, in accordance with an exemplary embodiment of the present disclosure.

The environment 100 may include a server 102 configured for generating the network design document for the communication network using the generative AI model. It should be noted that the server 102 may be configured to generate any number of network design documents for multiple communication networks based on user requirements. However, for ease of explanation, generation of one network design document is explained. In particular, the generative AI model may be hosted on the server 102 to generate the network design document for the communication network in response to receiving a user query. The generative AI model may automatically generate the network design document based on the user query. Examples of the server 102 may include, but are not limited to, an application server, a smartphone, a laptop, a desktop, a tablet, and the like. As known to a person skilled in the art, the generative AI model may be referred to as a model that is designed to answer user queries and generate new data or content (text, images, audio, and the like). The generative AI model has capabilities to answer user queries and produce new and original content that may be used in various applications, such as content generation, creative tasks, data synthesis, and the like.—

The generative AI model uses unsupervised and semi-supervised machine learning algorithms to analyze a query received from the user and guides him accordingly to resolve the query. Examples of the generative AI model include, but are not limited to, a Generative Pretrained Transformer (GPT-3), a Large Language Model (LLM), a foundation model, a Generative Adversarial Network (GAN), a variational autoencoder (VAE), a Deep Belief Network (DBN), a Recurrent Neural Network (RNN). In some embodiments, the generative AI model may be an ensembled model.

It should be noted that the generative AI model may be pretrained based on network data of a plurality of communication networks associated with an entity. In particular, the generative AI model may be pretrained specific to the entity to create the network design document considering the plurality of communication networks that are existing and associated with the entity. As will be appreciated, the generative AI model may be pretrained specifically for the entity to assist members of a telecommunication team in creating the network design document for the entity based on specific requirements of the entity.

Examples of the entity may include but are not limited to, a business enterprise, a service provider, a government agency, an educational institute, a healthcare provider, a financial institute, an information technology entity, and the like. The network data may include network design and build documentation data for a set of network requirements, network use cases data, and network topologies data. In some embodiments, the generative AI model may be pretrained based on the network data of communication networks associated with a plurality of entities. In other words, the generative AI model may be pretrained based on variety of telecommunication network design and build documentations created for various entities for different sets of network requirements.

Further, in order to generate the network design document for the communication network, initially, the generative AI model may receive a user query corresponding to the communication network. In one exemplary embodiment, the communication network may be a new telecommunication network that the entity wants to implement. In another exemplary embodiment, the communication network may be an existing telecommunication network that the entity wants to modify and implement based on their requirements. A user, i.e., a member of the telecommunication team (e.g., a network engineer, a network architect, a network designer, a network planner, and the like) may access the generative AI model via a computing device 104. The computing device 104 may be a user device. Examples of the computing device 104 may include, but are not limited to, a laptop, a desktop, a tablet, a smartphone, and the like. In other words, the user may provide the user query as an input to the generative AI model via a Graphical User Interface (GUI) of the computing device 104. In some embodiments, the generative AI model may be integrated with the computing device 104. As will be appreciated, in some exemplary embodiment, the generative AI model may correspond to a generative AI-powered live assistant bot.

Further, the user of the computing device 104 may access the generative AI model hosted on the server 102 via a communication network 106. In particular, the computing device 104 may interact with the server 102 via the communication network 106. In addition, the network data of the plurality of communication networks associated with the entity may be stored within a database (not shown) of the server 102. The database may correspond to a network operational support system (OSS). As already known to a person skilled in the art, the network OSS is a set of tools, platforms that is used to manage and support day-to-day operations of telecommunication networks. It should be noted that a telecommunication network may correspond to the communication network. Further, the database may be periodically updated based on updates in the network data associated with each of the plurality of communication networks of the entity.

Examples of the communication network 106 may include, but are not limited to, a wireless fidelity (Wi-Fi) network, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, and a combination thereof. In an embodiment, the communication network 106 may facilitate data exchange between the computing device 104 and the server 102.

The user query may include details of requirements or specific needs of the entity for the communication network that is to be implemented or modified. In an embodiment, the entity requirements may be manually gathered by the user (e.g., the network engineer) from an individual (e.g., an Information Technology (IT) manager, or a chief information officer, etc.) associated with the entity. For example, the network engineer may ask questions related to the communication network that the entity wants to implement from the IT officer. For example, the questions may be, primary objective that the communication network must support, approximate number of users of the communication network, types of devices that use the communication network, applications and services that run on the communication network, and the like. The collected requirements of the entity may be provided in form of the user query as an input to the generative AI model. As will be appreciated, the user query may be received in a textual format. Further, in some embodiments, the user query may be received in the form of one or more multi-modal inputs, such as a text, an audio, a live screen display, etc.

Upon receiving the user query as the input, the generative AI model may be configured to retrieve current network information associated with the communication network. The current network information for the communication network may include layout of each of the plurality of communication networks of the entity, performance of each of the plurality of communication networks, bandwidth required by each of the plurality of communication networks, applications and services running on each of the plurality of communication networks, logical and physical network topologies illustrating connectivity of each device within each of the plurality of communication networks, and the like.

The current network information may be retrieved using a pre-defined retrieving technique. Examples of the pre-defined retrieving technique may include, but are not limited to, a Retrieval Augmented Generation (RAG) technique, a model fine tuning technique, and a parameter efficient fine tuning (PEFT) technique. As will be appreciated, in one embodiment, the current network information may be retrieved by the generative AI model from the database using the pre-defined retrieving technique. In another embodiment, the current network information may be received as a user input with the user query. Further, the generative AI model may analyze the user query to retrieve the current network information from the user query using the pre-defined retrieving technique.

By way of an example, consider a scenario where a business executive (e.g., the chief information officer) is planning to establish a new communication network (i.e., a telecommunication network) for his enterprise (i.e., the entity), as the enterprise has grown rapidly, and current network infrastructure of the enterprise is outdated. To establish the new communication network, the chief information officer may contact a network architect (i.e., the user). The network architect may gather requirements of the chief information officer corresponding to the new communication network. For example, the network architect may query the chief information officer to gather information about issues in the current network infrastructure, bottlenecks in the current network infrastructure, areas of poor performance in the current network infrastructure, specific communication requirements considering voice communication, data transfer, video conferencing, and other collaboration tools used within the enterprise, and the like.

Upon collecting the requirements for the new communication network, the network architect may provide the collected requirements as an input, i.e., the user query to the generative AI model. As will be appreciated, the network architect may provide the user query via the computing device 104. Further, the user query may be transmitted to the generative AI model hosted on the server 102 over the communication network 106. Upon receiving the user query for the new communication network, the generative AI model may retrieve current network information of existing communication networks (i.e., the plurality of communication networks) associated with the enterprise of the chief information officer, for the new communication network. For example, the current network information may include layout of the existing communication networks, performance of the existing communication networks, bandwidth required by the existing communication networks, applications and services running on the existing communication networks, etc.

Once the current network information is retrieved, the generative AI model may be configured to process the user query and the current network information associated with the communication network. Further, based on the processing, the generative AI model may be configured to generate the network design document for the communication network in a pre-defined format. Examples of the pre-defined format may include, but are not limited to, Microsoft word (e.g., .doc, or .docx), Portable Document Format (PDF), Microsoft Visio, Hypertext Markup Language (HTML), Markdown, Google Docs, and the like.

It should be noted that the network design document may be generated based on an autoregressive language modeling. The autoregressive language modeling is a type of machine learning based language modeling approach that uses autoregressive techniques to predict a next word in a sequence of words based on preceding words or context. In other words, in order to generate the network design document, the generative AI model may process the user query and the current network information using the autoregressive language modeling to predict missing information within the user query and the current network information. This is done by predicting the next word in the sequence of words within the user query and the current network information based on preceding words within the user query and the current network information.

In an embodiment, the generated network design document may be one of a high-level design document, a low-level design document, a deployment design document, and a network security policies and guidelines document. As will be appreciated, the network design document may be generated corresponding to the user query. In other words, if the user query is received for generating the high-level design document, then the generative AI model may process the user query and the current network information to generate the high-level design document. It should be noted that the network design document for the communication network may be a comprehensive and detailed plan that outlines structure, components, and specifications of the communication network. In particular, the network design document may serve as a blueprint for building, expanding, or modifying any communication network in order to provide guidance to network architects, engineers, administrators, and other stakeholders involved in network designing and implementation process.

Further, the network design document generated for the communication network may be rendered to the user. The network design document may be rendered to the user via a Graphical User Interface (GUI) of the computing device 104. In other words, once the network design document is generated by the generative AI model, the server 102 may transmit the network design document to the computing device 104 over the communication network 106. The user may utilize the network design document for implementing the communication network. Additionally, upon receiving the network design document, the user may provide feedback. The feedback may be any corrections or modifications that are made in the network design document generated for the communication network. Further, the feedback provided by the user corresponding to the network design document may be received by the generative AI model. Based on the feedback, the generative AI model may be updated.

In continuation to the above example of creating the new communication network, once the user query and the current network information is retrieved, then the generative AI model may process the user query and the current network information for the new communication network using the autoregressive language modeling. Further, based on the processing, the generative AI model may generate the network design document for the enterprise. The generated network design document may be rendered to the network architect. The network architect may modify some portions of the network design document as per the need of the chief information officer corresponding to the new communication network. The modification done to some portions of the network design document may be received as feedback by the generative AI model. The generative AI model may use the feedback to update itself for creating a network design document for similar communication networks in future. The above discussed technique of generating the network design document for the communication network is further explained in detail in conjunction with FIGS. 2-6.

Figure 2:
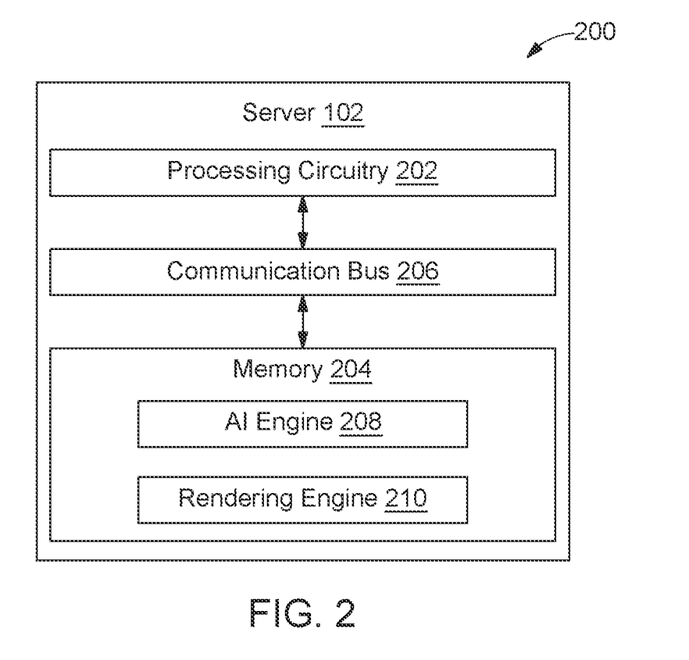
FIG. 2 illustrates a block diagram of a server configured for generating a network design document for a communication network, in accordance with an exemplary embodiment of the present disclosure.

Referring now to FIG. 2, a block diagram 200 of a server 102 configured for generating a network design document for a communication network is illustrated, in accordance with an exemplary embodiment of the present disclosure. FIG. 2 is explained in conjunction with FIG. 1. The server 102 may include a processing circuitry 202, and a memory 204 communicatively coupled to the processing circuitry 202 via a communication bus 206.

The memory 204 may store various data that may be captured, processed, and/or required by the server 102. The memory 204 may be a non-volatile memory (e.g., flash memory, Read Only Memory (ROM), Programmable ROM (PROM), Erasable PROM (EPROM), Electrically EPROM (EEPROM) memory, etc.) or a volatile memory (e.g., Dynamic Random Access Memory (DRAM), Static Random-Access memory (SRAM), etc.).

The memory 204 may also store processor-executable instructions. The processor-executable instructions, when executed by the processing circuitry 202, may cause the processing circuitry 202 to implement one or more embodiments of the present disclosure such as, but not limited to, receiving a user query corresponding to the communication network to generate the network design document for the communication network, retrieving current network information associated with the communication network, processing the user query and the current network information associated with the communication network, and generating in a pre-defined format, the network design document for the communication network. The memory 204 may include an AI engine 208, and a rendering engine 210. The memory 204 may also include a database (not shown) for storing data and intermediate results generated by the engines 208 and 210.

Initially, the AI engine 208 may be configured to receive a user query. The user query may be received corresponding to a communication network. In an embodiment, the communication network may be a new telecommunication network or an existing communication network. It should be noted that the AI engine 208 may correspond to the generative AI model. The AI engine 208 may be pretrained based on network data of a plurality of communication networks associated with an entity. Examples of the entity may include a business enterprise, a service provider, a government agency, an educational institute, a healthcare provider, a financial institute, an information technology entity, and the like.

Further, the network data may include network design and build documentation data for a set of network requirements, network use cases data, and network topologies data. In some embodiments, the generative AI model may be pretrained based on the network data of communication networks associated with a plurality of entities. In other words, the generative AI model may be pretrained based on variety of telecommunication network design and build documentations created for various entities for different sets of network requirements.

As will be appreciated, the AI engine 208 may be pretrained to generate the network design document for the communication network based on requirements of the entity. Further, the user query received as an input from the user may include requirements or specific needs of the entity corresponding to the communication network that is to be implemented. The requirements of the entity may be manually gathered by the user (e.g., a network planner) from an individual (e.g., an IT manager, or a chief information officer, etc.) associated with the entity.

Upon receiving the user query as the input, the AI engine 208 may be configured to retrieve current network information associated with the communication network. The current network information may include layout of each of the plurality of communication networks of the entity, performance of each of the plurality of communication networks, bandwidth required by each of the plurality of communication networks, applications and services running on each of the plurality of communication networks, logical and physical network topologies illustrating connectivity of each device within each of the plurality of communication networks, and the like. Further, the AI engine 208 may retrieve the current network information using a pre-defined retrieving technique. Examples of the pre-defined retrieving technique may include, but are not limited to, a RAG technique, a model fine tuning technique, and a PEFT technique.

It should be noted that, in one embodiment, the AI engine 208 may retrieve the current network information from a database (not shown). The database may include the network data associated with the plurality of communication networks of the entity. Further, the database may be periodically updated based on the network data associated with each of the plurality of communication networks. By way of an example, suppose a new device or a service may have been added to a communication network (i.e., an existing communication network) of the plurality of communication networks. In this case, the database may be updated based on change (i.e., the addition of the new device or the service) in the network data of the existing communication network. In another embodiment, the current network information may be received as a user input along with the user query. Further, the AI engine 208 may analyze the user query to retrieve the current network information from the user query using the pre-defined retrieving technique.

Once the current network information is retrieved, the AI engine 208 may be configured to process the user query and the current network information associated with the communication network. The AI engine 208 may process the user query and the current network information using autoregressive language modeling. The autoregressive language modeling is a type of machine learning based language modeling approach that uses autoregressive techniques to predict a next word in a sequence of words based on preceding words or context. In other words, in order to generate the network design document, the generative AI model may process the user query and the current network information using the autoregressive language modeling to predict missing information within the user query and the current network information. This is done by predicting the next word in the sequence of words within the user query and the current network information based on preceding words within the user query and the current network information.

Further, in response to processing the user query and the current network information, the AI engine 208 may generate the network design document for the communication network. In an embodiment, the generated network design document may be one of a high-level design document, a low-level design document, a deployment design document, and a network security policies and guidelines document. The AI engine 208 may generate the network design document in a pre-defined format. Examples of the pre-defined format may include, but are not limited to, Microsoft word (e.g., .doc, or .docx), PDF, Microsoft Visio, HTML, Markdown, Google Docs, and the like.

Once the network design document for the communication network is generated, the AI engine 208 may send the network design document to the rendering engine 210. The rendering engine 210 may be configured to render the network design document to the user. In particular, the rendering engine 210 may transmit and render the network design document on a user device (i.e., the computing device 104) via GUI of the user device. The user device (also referred to as device) may be associated with a user. Upon rendering the network design document, the AI engine 208 may be configured to receive the feedback corresponding to the network design document from the user via the GUI. In an embodiment, the feedback may be any corrections or refinements that may be done by the user in the network design document while reviewing the network design document. Further, based on the received feedback, the AI engine 208 may be updated. In other words, the AI engine 208 may continuously evolve and learn based on the feedback from the user.

It should be noted that all such aforementioned engines 208 and 210 may be represented as a single module or a combination of different modules. Further, as will be appreciated by those skilled in the art, each of the engines 208 and 210 may reside, in whole or in parts, on one device or multiple devices in communication with each other. In some embodiments, each of the engines 208 and 210 may be implemented as dedicated hardware circuit comprising custom application-specific integrated circuit (ASIC) or gate arrays, off-the-shelf semiconductors such as logic chips, transistors, or other discrete components. Each of the engines 208 and 210 may also be implemented in a programmable hardware device such as a field programmable gate array (FPGA), programmable array logic, programmable logic device, and so forth. Alternatively, each of the engines 208 and 210 may be implemented in software for execution by various types of processors (e.g., the processing circuitry 202). An identified module of executable code may, for instance, include one or more physical or logical blocks of computer instructions, which may, for instance, be organized as an object, procedure, function, or other construct. Nevertheless, the executables of an identified module or component need not be physically located together but may include disparate instructions stored in different locations which, when joined logically together, include the module and achieve the stated purpose of the module. Indeed, a module of executable code could be a single instruction, or many instructions, and may even be distributed over several different code segments, among different applications, and across several memory devices.

As will be appreciated by one skilled in the art, a variety of processes may be employed for generating the network design document for the communication network using the generative AI model. For example, the exemplary server 102 may include the AI engine 208 configured to generate the network design document for the communication network by the processes discussed herein. In particular, as will be appreciated by those of ordinary skill in the art, control logic and/or automated routines for performing the techniques and steps described herein may be implemented by the server 102 either by hardware, software, or combinations of hardware and software. For example, suitable code may be accessed and executed by the one or more processors on the server 102 to perform some or all of the techniques described herein. Similarly, application specific integrated circuits (ASICs) configured to perform some, or all of the processes described herein may be included in the one or more processors on the server 102.

Figure 3:
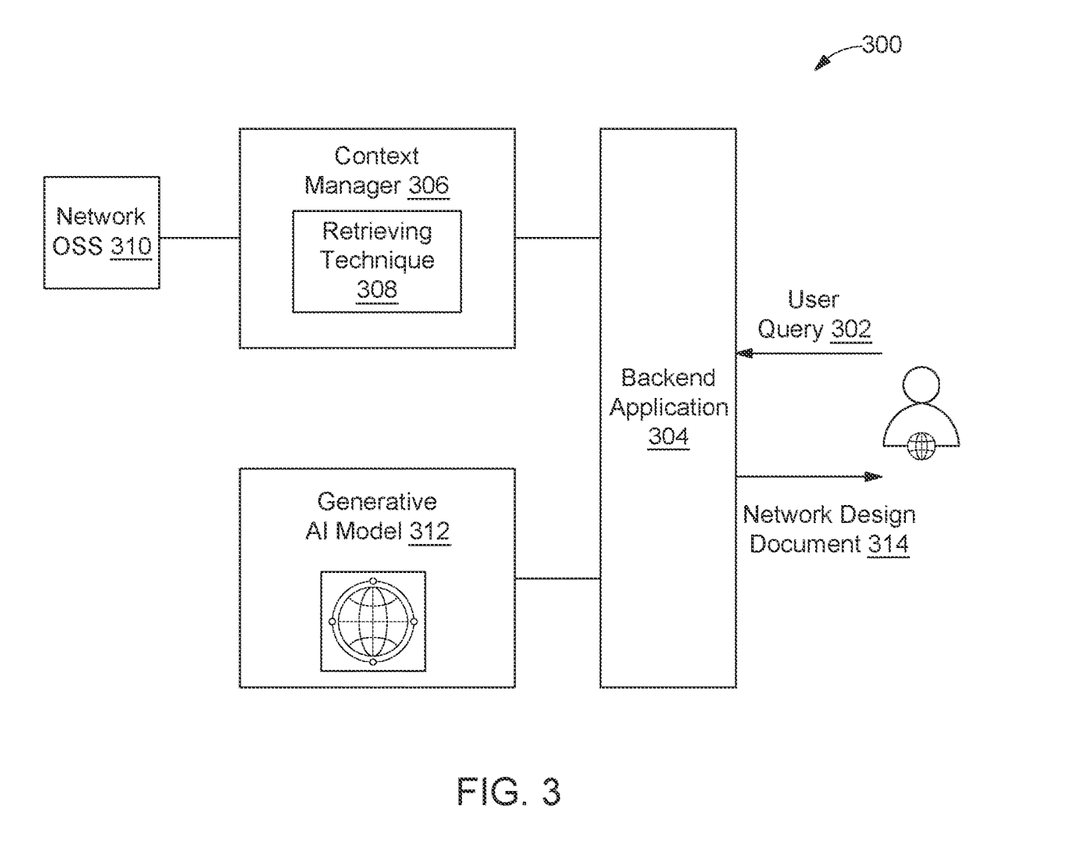
FIG. 3 illustrates a control logic for generating a network design document for a communication network, in accordance with an exemplary embodiment of the present disclosure.

Referring now to FIG. 3, a control logic 300 for generating a network design document for a communication network is illustrated, in accordance with an exemplary embodiment of the present disclosure. FIG. 3 is explained in conjunction with FIGS. 1 and 2. The network design document may be generated by a generative AI model 312. The generative AI model 312 may correspond to the AI engine 208.

As depicted via the control logic 300, initially, a backend application 304 may be configured to receive a user query 302. As will be appreciated, the backend application 304 may reside on the server 102. It should be noted that the user may provide the user query 302 via the GUI of the computing device 104. Further, the user query 302 may be received corresponding to a communication network for generating a network design document 314 for the communication network. In an embodiment, the user query 302 may include requirements or specific needs of the entity corresponding to the communication network that is to be implemented. The requirements of the entity may be manually gathered by the user (i.e., the member of the telecommunication team) from an individual (e.g., the IT manager, or the chief information officer, etc.) associated with the entity.

Further, the backend application 304 may send the user query 302 to the generative AI model 312. Upon receiving the user query 302, the generative AI model 312 may retrieve current network information associated with the communication network via the backend application 304. For this, the backend application 304 may instruct a context manager 306 to retrieve the current network information from a network OSS 310 (i.e., the database). The current network information may include layout of each of the plurality of communication networks of the entity, performance of each of the plurality of communication networks, bandwidth required by each of the plurality of communication networks, applications and services running on each of the plurality of communication networks, logical and physical network topologies illustrating connectivity of each device within each of the plurality of communication networks, and the like. The context manager 306 may retrieve the current network information of the communication network using a retrieving technique 308 (i.e., the pre-defined retrieving technique). Examples of the pre-defined retrieving technique may include, but are not limited to, a RAG technique, a model fine tuning technique, and a PEFT technique. It should be noted that, in an embodiment, the processing circuitry 202 of the server 102 may be configured to execute each function that is performed by the context manager 306.

Further, the backend application 304 may send the retrieved current network information to the generative AI model 312. In some embodiments, the current network information may be received as a user input from the user along with the user query 302. The generative AI model 312 may then process the user query 302 and the current network information to generate the network design document 314 for the communication network. The generative AI model 312 may generate the network design document 314 in the pre-defined format. Once the network design document 314 is generated, the network design document 314 may be rendered to the user. A method of generating the network design document for the communication network is further explained in detail in conjunction with FIG. 5 and FIG. 6.

Figure 4:
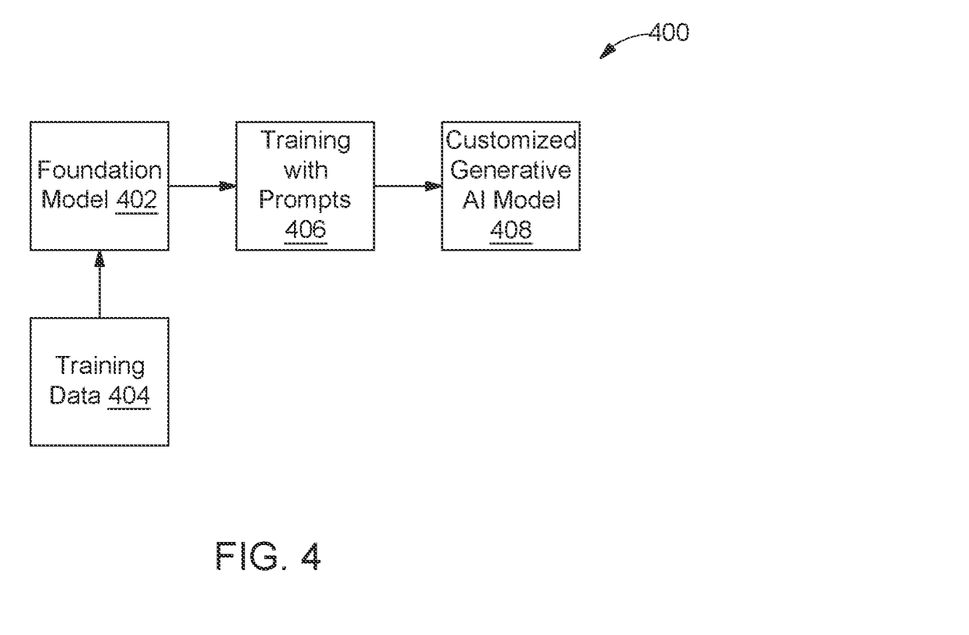
FIG. 4 illustrates an exemplary process for training a generative AI model for generating a network design document, in accordance with an exemplary embodiment of the present disclosure.

Referring now to FIG. 4, an exemplary process 400 for training a generative AI model for generating a network design document is illustrated, in accordance with an exemplary embodiment of the present disclosure. FIG. 3 is explained in conjunction with FIGS. 1, 2, and 3.

Initially, a foundation model 402 may be trained based on training data 404 for generating network design documents for communication networks for an entity. Examples of the entity may include, but are not limited to, a business enterprise, a service provider, a government agency, an educational institute, a healthcare provider, a financial institute, and an information technology entity. The foundation model 402 may correspond to a raw generative AI model. In other words, the foundation model 402 may correspond to a generative AI model that has not yet been trained for the purpose of generating the network design documents. Further, the training data 404 may correspond to network data associated with a plurality of communication networks of the entity. In particular, the foundation model 402 may be trained based on the network data associated with the plurality of communication networks associated with the entity. In some embodiments, the foundation model 402 may be trained based on network data of communication networks associated with a plurality of entities. In other words, the foundation model 402 may be pretrained based on variety of telecommunication network design and build documentations created for various entities for different sets of network requirements. The network data may include the network design and build documentation data for the set of network requirements, the network use cases data, and the network topologies data. It should be noted that, in some embodiments, more than one foundation model may be pretrained based on the variety of the telecommunication network design and build documentations created for various entities for different sets of network requirements.

Upon feeding the training data 404, i.e., the network data, the foundation model 402 may be configured to generate a corresponding output (e.g., a network design document). The output may be analyzed by the user to check if the generated output is an expected output or not. Further, the foundation model 402 may be trained with prompts 406 to generate the expected output. The prompts 406 may be crafted by a user to adjust parameters (i.e., network parameters within the network data) based on the analysis of the output generated by the foundation model 402. In particular, the prompts 406 may be a set of instructions or input given to the foundation model 402 to trigger the foundation model 402 for generating different sections of the network design document. For example, the prompts 406 may include information on network topology, security measures, hardware specifications, or any other relevant details needed in the network design document.

It should be noted that RAG techniques may be iteratively generated for training the foundation model 402 until the foundation model 402 is fine-tuned and a customized generative AI model 408 is obtained. Further, the customized generative AI model 408 may be deployed in an entity's environment to generate network design documents for the entity as and when required. With reference to FIG. 3, the customized generative AI model 408 may correspond to the generative AI model 312. Further, the customized generative AI model 408 may be progressively trained using an incremental learning approach based on the feedback received from the user on the network design document generated for the communication network based on the user query. It should be noted that the prompts 406 and the RAG techniques may refine the customized generative AI model 408, user queries, and generate the network design documents depending upon context of the user queries.

Figure 5:
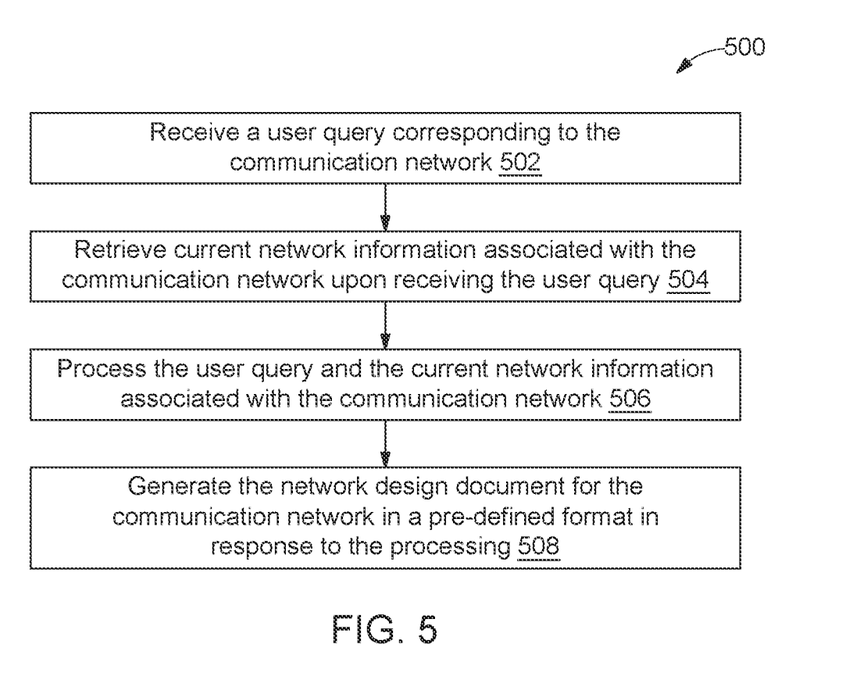
FIG. 5 illustrates a flow diagram of an exemplary process for generating a network design document for a communication network using a generative AI model, in accordance with an exemplary embodiment of the present disclosure.

Referring now to FIG. 5, a flow diagram of an exemplary process 500 for generating a network design document for a communication network using a generative AI model is illustrated, in accordance with an exemplary embodiment of the present disclosure. FIG. 5 is explained in conjunction with FIGS. 1, 2, 3, and 4. In an embodiment, each step of the process 500 may be implemented by the generative AI model 312.

Initially at step 502, a user query corresponding to the communication network may be received. The user query may be received for generating the network design document for the communication network. In an embodiment, the network design document may be one of a high-level design document, a low-level design document, a deployment design document, and a network security policies and guidelines document. Further, the generative AI model 312 may receive the user query. As known to a person skilled in the art, the generative AI model 312 may be referred to as a model that is designed to answer user queries and generate new data or content (text, images, audio, and the like). Examples of the generative AI model 312 may include, but are not limited to, a Generative Pretrained Transformer (GPT-3), a Large Language Model (LLM), a foundation model, a Generative Adversarial Network (GAN), a variational autoencoder (VAE), a Deep Belief Network (DBN), a Recurrent Neural Network (RNN).

In one exemplary embodiment, the communication network for which the network design document needs to be generated may be a new telecommunication network that the entity wants to implement. In another exemplary embodiment, the communication network may be an existing telecommunication network that the entity wants to modify and implement based on their requirements. The user query may include details of requirements or specific needs of the entity corresponding to the communication network that is to be implemented or modified. In an embodiment, the entity requirements may be manually gathered by the user (i.e., the member of the telecommunication team) from an individual (e.g., an IT manager, or a chief information officer, etc.) associated with the entity. For example, the network engineer may simply ask questions related to the communication network that the entity wants to implement from the IT officer.

It should be noted that the generative AI model may be pretrained based on network data of a plurality of communication networks associated with an entity. Examples of the entity may include but are not limited to, a business enterprise, a service provider, a government agency, an educational institute, a healthcare provider, a financial institute, an information technology entity, and the like. The network data may include network design and build documentation data for a set of network requirements, network use cases data, and network topologies data. In some embodiments, the generative AI model may be pretrained based on the network data of communication networks associated with a plurality of entities. As will be appreciated, the generative AI model 312 may be used by the user to generate network design documents for any type of communication networks based on specific customers network requirements, greenfield, or brown field.

Further, upon receiving the user query, at step 504, current network information associated with the communication network may be retrieved. In an embodiment, the current network information may include layout of each of the plurality of communication networks of the entity, performance of each of the plurality of communication networks, bandwidth required by each of the plurality of communication networks, applications and services running on each of the plurality of communication networks, logical and physical network topologies illustrating connectivity of each device within each of the plurality of communication networks, and the like.

It should be noted that the current network information may be retrieved using a predefined retrieving technique. Examples of the pre-defined retrieving technique may include, but are not limited to, a RAG technique, a model fine tuning technique, and a PEFT technique. The generative AI model 312 may retrieve the current network information. As will be appreciated, in one embodiment, the current network information may be retrieved by the generative AI model 312 from a database using the pre-defined retrieving technique. With reference to FIG. 3, the database may correspond to a network OSS, i.e., the network OSS 310. The network OSS may be a set of tools, platforms that is used to manage and support day-to-day operations of telecommunication networks. It should be noted that the database may be periodically updated based on updates in the network data associated with each of the plurality of communication networks of the entity. By way of an example, the database may be periodically updated by the members of the telecommunication team of the entity. In another embodiment, the current network information may be received as a user input along with the user query. Further, the generative AI model 312 may analyze the user query to retrieve the current network information from the user query using the pre-defined retrieving technique.

At step 506, the user query and the current network information associated with the communication network may be processed. Further, in response to the processing, at step 508, the network design document for the communication network may be generated. In an embodiment, the network design document may be generated in a pre-defined format. Examples of the pre-defined format may include, but are not limited to, Microsoft word (e.g., .doc, or .docx), PDF, Microsoft Visio, HTML, Markdown, Google Docs, and the like.

It should be noted that the network design document may be generated based on an autoregressive language modeling by the generative AI model 312. As already known to the person skilled in the art, the autoregressive language modeling is a type of machine learning based language modeling approach that uses autoregressive techniques to predict a next word in a sequence of words based on preceding words or context. In other words, in order to generate the network design document, the generative AI model 312 may process the user query and the current network information using the autoregressive language modeling to predict missing information within the user query and the current network information. This is done by predicting the next word in the sequence of words within the user query and the current network information based on preceding words within the user query and the current network information. In particular, the generative AI model 312 may employ transformer models with encoding and decoding techniques to process the user query and the current network information. Further, the network design document generated for the communication network may be rendered to the user.

Figure 6:
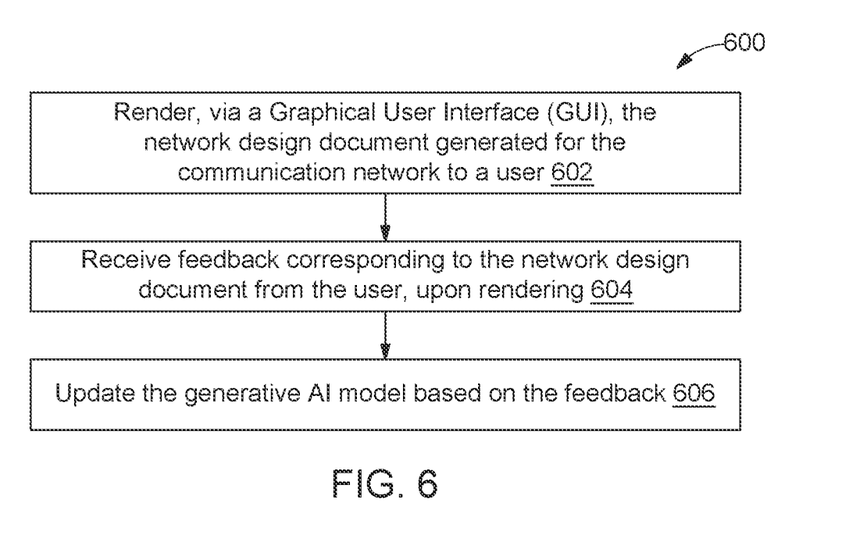
FIG. 6 illustrates a flow diagram of an exemplary process of updating a generative AI model, in accordance with an exemplary embodiment of the present disclosure.

Referring now to FIG. 6, a flow diagram of an exemplary process 600 of updating a generative AI model (same as the generative AI model 312) is illustrated, in accordance with an exemplary embodiment of the present disclosure. FIG. 6 is explained in conjunction with FIGS. 1, 2, 3, 4, and 5. In an embodiment, each step of the process 600 may be implemented by the generative AI model 312.

With reference to the FIG. 5, as mentioned in step 508, once the network design document is generated, at step 602, the generated network design document may be rendered to the user via a GUI. With reference to FIG. 1, the GUI may be a GUI of the computing device 104. In particular, once the generative AI model 312 may generate the network design document, then the server 102 may transmit the network design document to the computing device 104 over the communication network 106 and render via the GUI of the computing device 104.

Upon rendering the network design document, the user may analyze the network design document for any issues. Based on the analysis, the user may make suitable corrections or refinements in the network design document as per needs or requirements of the entity corresponding to the communication network. At step 604, the corrections or the refinements done in the network design document may be received as the feedback by the generative AI model 312. In some embodiments, the feedback may be received by the generative AI model 312 via the GUI of the computing device 104. Further, at step 606, the generative AI model 312 may be updated based on the feedback. In this way, the generative AI model 312 may continuously evolve and learn for generating network design documents for similar communication networks in future.

As will be also appreciated, the above-described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 7:
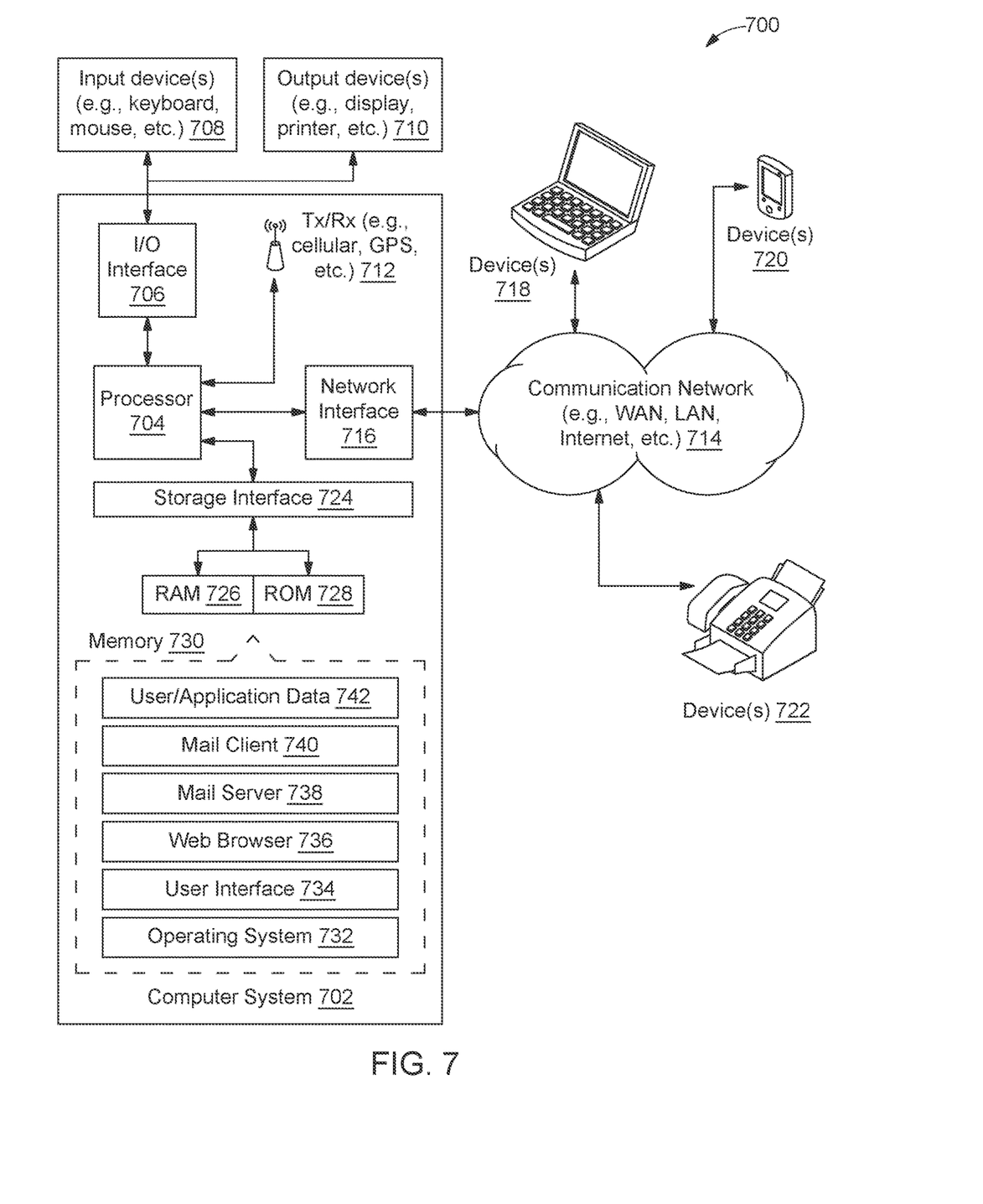
FIG. 7 is a block diagram that illustrates a system architecture of a computer system for generating a network design document for a communication network using a generative AI model, in accordance with an exemplary embodiment of the present disclosure.

The disclosed methods and systems may be implemented on a conventional or a general-purpose computer system, such as a personal computer (PC) or server computer. FIG. 7 is a block diagram that illustrates a system architecture 700 of a computer system 702 for managing extensions of a product, in accordance with an exemplary embodiment of the present disclosure. Variations of the computer system 702 may be used for implementing the server 102 for generating a network design document for a communication network using a generative Artificial Intelligence (AI) model. The computer system 702 may include a central processing unit ("CPU" or "processor") 704. The processor 704 may include at least one data processor for executing program components for executing user or system-generated requests. A user may include a person, a person using a device, such as those included in this disclosure, or such a device itself. The processor 704 may include specialized processing units such as integrated system (bus) controllers, memory management control units, floating point units, graphics processing units, digital signal processing units, etc. The processor 704 may include a microprocessor, such as AMD® ATHLOM® microprocessor, DURON® microprocessor OR OPTERON® microprocessor ARM's application, embedded or secure processors, IBM® POWERPC®, INTEL'S CORE® processor, ITANIUM® processor, XEON® processor, CELERON® processor or other line of processors. The processor 704 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

The processor 704 may be disposed in communication with one or more input/output (I/O) devices via an I/O interface 706. The I/O interface 706 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (for example, code-division multiple access (CDMA), high-speed packet access (HSPA+), global system for mobile communications (GSM), long-term evolution (LTE), WiMAX, or the like), etc.

Using the I/O interface 706, the computer system 702 may communicate with the one or more I/O devices. For example, an input device 708 may be an antenna, keyboard, mouse, joystick, (infrared) remote control, camera, card reader, fax machine, dongle, biometric reader, microphone, touch screen, touchpad, trackball, sensor (for example, accelerometer, light sensor, GPS, gyroscope, proximity sensor, or the like), stylus, scanner, storage device, transceiver, video device/source, visors, etc. An output device 710 may be a printer, fax machine, video display (for example, cathode ray tube (CRT), liquid crystal display (LCD), light-emitting diode (LED), plasma, or the like), audio speaker, etc. In some embodiments, a transceiver 712 may be disposed in connection with the processor 704. The transceiver 712 may facilitate various types of wireless transmission or reception. For example, the transceiver 712 may include an antenna operatively connected to a transceiver chip (for example, TEXAS® INSTRUMENTS WILINK WL1286® transceiver, BROADCOM® BCM4550IUB8® transceiver, INFINEON TECHNOLOGIES® X-GOLD 618-PMB9800® transceiver, or the like), providing IEEE 802.6a/b/g/n, Bluetooth, FM, global positioning system (GPS), 2G/3G HSDPA/HSUPA communications, etc.

In some embodiments, the processor 704 may be disposed in communication with a communication network 714 via a network interface 716. The network interface 716 may communicate with the communication network 714. The network interface 716 may employ connection protocols including, without limitation, direct connect, Ethernet (for example, twisted pair 10/100/1000 Base T), transmission control protocol/internet protocol (TCP/IP), token ring, IEEE 802.11a/b/g/n/x, etc. The communication network 714 may include, without limitation, a direct interconnection, local area network (LAN), wide area network (WAN), wireless network (for example, using Wireless Application Protocol), the Internet, etc. Using the network interface 716 and the communication network 714, the computer system 702 may communicate with devices 718, 720, and 722. These devices may include, without limitation, personal computer(s), server(s), fax machines, printers, scanners, various mobile devices such as cellular telephones, smartphones (for example, APPLE® IPHONE® smartphone, BLACKBERRY® smartphone, ANDROID® based phones, etc.), tablet computers, eBook readers (AMAZON® KINDLE® reader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, the computer system 702 may itself embody one or more of these devices.

In some embodiments, the processor 704 may be disposed in communication with one or more memory devices (for example, a Random Access Memory (RAM) 726, a Read-Only Memory (ROM) 728, etc.) via a storage interface 724. The storage interface 724 may connect to a memory 730 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory 730 may store a collection of program or database components, including, without limitation, an operating system 732, a user interface 734, a web browser 736, a mail server 738, a mail client 740, user/application data 742 (for example, any data variables or data records discussed in this disclosure), etc. The operating system 732 may facilitate resource management and operation of the computer system 702. Examples of the operating systems 732 include, without limitation, APPLE® MACINTOSH® OS X platform, UNIX platform, Unix-like system distributions (for example, Berkeley Software Distribution (BSD), FreeBSD, NetBSD, OpenBSD, etc.), LINUX distributions (for example, RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like. The user interface 734 may facilitate display, execution, interaction, manipulation, or operation of program components through textual or graphical facilities. For example, user interfaces may provide computer interaction interface elements on a display system operatively connected to the computer system 702, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (for example, AERO® platform, METRO® platform, etc.), UNIX X-WINDOWS, web interface libraries (for example, ACTIVEX® platform, JAVA® programming language, JAVASCRIPT® programming language, AJAX® programming language, HTML, ADOBE® FLASH® platform, etc.), or the like.

In some embodiments, the computer system 702 may implement a web browser 736 stored program component. The web browser 736 may be a hypertext viewing application, such as MICROSOFT® INTERNET EXPLORER® web browser, GOOGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers may utilize facilities such as AJAX, DHTML, ADOBE® FLASH® platform, JAVASCRIPT® programming language, JAVA® programming language, application programming interfaces (APIs), etc. In some embodiments, the computer system 702 may implement a mail server 738 stored program component. The mail server 738 may be an Internet mail server such as MICROSOFT® EXCHANGE® mail server, or the like. The mail server 738 may utilize facilities such as ASP, ActiveX, ANSI C++/C#, MICROSOFT. NET® programming language, CGI scripts, JAVA® programming language, JAVASCRIPT® programming language, PERL® programming language, PHP® programming language, PYTHON® programming language, WebObjects, etc. The mail server 738 may utilize communication protocols such as internet message access protocol (IMAP), messaging application programming interface (MAPI), Microsoft Exchange, post office protocol (POP), simple mail transfer protocol (SMTP), or the like. In some embodiments, the computer system 702 may implement a mail client 740 stored program component. The mail client 740 may be a mail viewing application, such as APPLE MAIL® mail-client, MICROSOFT ENTOURAGE® mail client, MICROSOFT OUTLOOK® mail client, MOZILLA THUNDERBIRD® mail client, etc.

In some embodiments, the computer system 702 may store user/application data 742, such as the data, variables, records, etc. as described in this disclosure, in one or more databases. Such databases may be implemented as fault-tolerant, relational, scalable, secure databases such as ORACLE® database OR SYBASE® database. Alternatively, such databases may be implemented using standardized data structures, such as an array, hash, linked list, struct, structured text file (for example, XML), table, or as object-oriented databases (for example, using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

Thus, the disclosed method and system try to overcome the technical problem of generating a network design document for a communication network using a generative AI model. The generative AI model of the disclosed method and system may receive a user query corresponding to the communication network to generate the network design document for the communication network. The generative AI model of the disclosed method and system may retrieve current network information associated with the communication network using a predefined retrieving technique, upon receiving the user query. The generative AI model of the disclosed method and system may process the user query and the current network information associated with the communication network. The generative AI model of the disclosed method and system may generate the network design document for the communication network in a predefined format, in response to the processing.

As will be appreciated by those skilled in the art, the techniques described in the various embodiments discussed above are not routine, or conventional, or well understood in art. The techniques discussed above generate a network design document for a communication network using a generative AI model. The above-discussed techniques may significantly reduce the amount of time and effort required in creating the network design documents. This may be achieved by using the generative AI model for processing a user query and current network information associated with the communication network. Further, the above-discussed techniques may minimize errors and discrepancies within the network design documents as the trained generative AI model may be able to efficiently understand and interpret user requirements corresponding to a communication network. It should be noted that the generative AI model may be able to efficiently understand and interpret the user requirements by processing the user query and the current network information. For this, the generative AI model may analyze text within the user query and the current network information to comprehend intended meaning of the text, considering semantics, syntax, and context of the user query. In particular, the generative AI model may process the user query and the current network information using the autoregressive language modeling to predict missing information within the user query and the current network information. In other words, usage of the generative AI model that is trained using various telecommunication design and technical documentations for generating the network design documents may reduce chances of human errors that occurs in creating of network design documents. In addition, the above-discussed techniques may continuously improve and evolve the generative AI model based on user feedback. Due to continuously evolving generating AI model and periodic updating of the network data to the database, the network design documents generation process may significantly improve. Further, using the above-discussed techniques, all such network design documents may be generated automatically, significantly reducing manual steps required for generating the network design documents.

In light of the above-mentioned advantages and the technical advancements provided by the disclosed method and system, the claimed steps as discussed above are not routine, conventional, or well understood in the art, as the claimed steps enable the following solutions to the existing problems in conventional technologies. Further, the claimed steps clearly bring an improvement in the functioning of the device itself as the claimed steps provide a technical solution to a technical problem.

The specification has described a method and system for generating a network design document for a communication network using a generative AI model. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A system for generating a network design document for a communication network using a generative Artificial Intelligence (AI) model, the system comprising:
   a processing circuitry; and
   a memory communicatively coupled to the processing circuitry, wherein the memory stores processor instructions, which when executed by the processing circuitry, cause the processing circuitry to:
   train based on training data and using machine learning (ML) algorithms and retrieval augmented generation (RAG) techniques, the generative AI model to generate network design documents, wherein the training data includes network data of a plurality of communication networks associated with an entity, and wherein the network data of each communication network is indicative of network design and build documentation data, network use case data, and network topology data of the corresponding communication network;
   receive a user query corresponding to the communication network to generate the network design document for the communication network;
   upon receiving the user query, retrieve current network information associated with the communication network using a retrieval augmented generation (RAG) technique, wherein the current network information includes at least two of a group comprising: a layout of each of the plurality of communication networks of the entity, performance of each of the plurality of communication networks, a bandwidth required by each of the plurality of communication networks, applications and services running on each of the plurality of communication networks, logical and physical network topologies illustrating connectivity of each device within each of the plurality of communication networks;
   process, using the trained generative AI model and autoregressive modeling, the user query and the current network information associated with the communication network; and
   in response to the processing, generate, using the trained generative AI model, the network design document, in a pre-defined format, for the communication network; and
   transmit the network design document to a user device associated with a user, wherein the network design document is rendered on a graphical user interface (GUI) of the user device.

2. The system of claim 1, wherein the current network information is received as one of a user input with the user query or retrieved by the processing circuitry from a database.

3. The system of claim 2, wherein the processor instructions, on execution, further cause the processing circuitry to:
   periodically update the database based on updates in the network data associated with each of the plurality of communication networks.

4. The system of claim 1, wherein the network design document is one of a high-level design document, a low-level design document, a deployment design document, and a network security policies and guidelines document.

5. The system of claim 1, wherein the processor instructions, on execution, further cause the processing circuitry to:
   receive feedback corresponding to the network design document from the user device; and
   update the trained generative AI model based on the feedback.

6. A method for generating a network design document for a communication network using a generative Artificial Intelligence (AI) model, the method comprising:
   training, by a server, based on training data and using machine learning (ML) algorithms and retrieval augmented generation (RAG) techniques, the generative AI model to generate network design documents, wherein the training data includes network data of a plurality of communication networks associated with an entity, and wherein the network data of each communication network is indicative of network design and build documentation data, network use case data, and network topology data of the corresponding communication network;

receiving, by the server, a user query corresponding to the communication network to generate the network design document for the communication network;

upon receiving the user query, retrieving, by the server, using the trained generative AI model, current network information associated with the communication network, using a retrieval augmented generation (RAG) technique, wherein the current network information includes at least two of a group comprising: a layout of each of the plurality of communication networks of the entity, performance of each of the plurality of communication networks, a bandwidth required by each of the plurality of communication networks, applications and services running on each of the plurality of communication networks, logical and physical network topologies illustrating connectivity of each device within each of the plurality of communication networks;

processing, by the server, using the trained generative AI model and autoregressive language modeling, the user query and the current network information associated with the communication network;

in response to the processing, generating in a pre-defined format, by the server, using the trained generative AI model, the network design document for the communication network; and transmitting, by the server, the network design document to a user device associated with a user, wherein the network design document is rendered on a graphical user interface (GUI) of the user device.

7. The method of claim 1, wherein retrieving, by the server, the current network information associated with the communication network comprises at least one of:
receiving the current network information as a user input with the user query; or
retrieving the current network information from a database.

8. The method of claim 7, further comprising:
periodically updating, by the server, the database based on updates in the network data associated with each of the plurality of communication networks.

9. The method of claim 1, wherein the network design document is one of a high-level design document, a low-level design document, a deployment design document, and a network security policies and guidelines document.

10. The method of claim 1, further comprising:
receiving, by the server from the user device, feedback corresponding to the network design document; and
updating, by the server, the trained generative AI model based on the feedback.

11. A non-transitory computer-readable medium storing computer-executable instructions generating a network design document for a communication network using a generative Artificial Intelligence (AI) model, the computer-executable instructions, when executed by a processor, cause the processor to perform operations comprising:

training, based on training data and using machine learning (ML) algorithms and retrieval augmented generation (RAG) techniques, the generative AI model to generate network design documents, wherein the training data includes network data of a plurality of communication networks associated with an entity, and wherein the network data of each communication network is indicative of network design and build documentation data, network use case data, and network topology data of the corresponding communication network receiving a user query corresponding to the communication network to generate the network design document for the communication network;

upon receiving the user query, retrieving, using the trained generative AI model, current network information associated with the communication network using a retrieval augmented generation (RAG) technique, wherein the current network information includes at least two of a group comprising: a layout of each of the plurality of communication networks of the entity, performance of each of the plurality of communication networks, a bandwidth required by each of the plurality of communication networks, applications and services running on each of the plurality of communication networks, logical and physical network topologies illustrating connectivity of each device within each of the plurality of communication networks;

processing, using the trained generative AI model and autoregressive language modeling, the user query and the current network information associated with the communication network;

in response to the processing, generating, using the trained generative AI model, in a pre-defined format the network design document for the communication network; and transmitting the network design document to a user device associated with a user, wherein the network design document is rendered on a graphical user interface (GUI) of the user device.

* * * * *